(12) United States Patent
Mallet et al.

(10) Patent No.: US 9,792,479 B2
(45) Date of Patent: *Oct. 17, 2017

(54) GEOMETRY TRACKING

(71) Applicant: LucasFilm Entertainment Company Ltd., San Francisco, CA (US)

(72) Inventors: Ronald Mallet, Mill Valley, CA (US); Kiran S. Bhat, San Francisco, CA (US); Kevin Wooley, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 14/167,838

(22) Filed: Jan. 29, 2014

(65) Prior Publication Data

US 2014/0147014 A1 May 29, 2014

Related U.S. Application Data

(63) Continuation of application No. 13/306,572, filed on Nov. 29, 2011, now Pat. No. 8,666,119.

(51) Int. Cl.
G06K 9/00 (2006.01)
G06T 19/00 (2011.01)
G06T 7/246 (2017.01)

(52) U.S. Cl.
CPC ............... *G06K 9/00* (2013.01); *G06T 7/251* (2017.01); *G06T 19/00* (2013.01); *G06T 2207/10016* (2013.01); *G06T 2207/30196* (2013.01)

(58) Field of Classification Search
CPC ......... G06T 19/00; G06T 19/20; G06T 17/00; G06T 2219/2021; G06T 2200/24; G06T 2210/44; G06T 15/00; G06T 17/05

(Continued)

(56) References Cited

U.S. PATENT DOCUMENTS 6,072,496 A * 6/2000 Guenter ............. G06K 9/00201
345/419
6,268,864 B1 7/2001 Chen et al.
(Continued)

FOREIGN PATENT DOCUMENTS

IL WO 2012/056443 * 5/2012

OTHER PUBLICATIONS

Author Unknown, "Lesson 3: Object-based tracking", Autodesk MatchMover 2011. Accessed Sep. 26, 2011. 6 pages Retrieved from: http://download.autodesk.com/us/maya/2011help-matchmover/files/WS73099cc142F48755-385a98b012180d20f19-5e97.htm.

(Continued)

*Primary Examiner* — Stephen R Koziol
*Assistant Examiner* — Shaghayegh Azima
(74) *Attorney, Agent, or Firm* — Kilpatrick Townsend & Stockton LLP (57) ABSTRACT

A method of motion capture may include accessing a 3D model of a subject, and associating the 3D model of the subject with a 2D representation of the subject in a plurality of frames. The method may also include identifying a change to the 2D representation of the subject between two or more of the plurality of frames, and deforming the 3D model in a virtual 3D space. In some embodiments, the deforming may be based on the identified change to the 2D representation and at least one constraint restricting how the 3D model can be deformed.

20 Claims, 6 Drawing Sheets (58) Field of Classification Search
USPC .................. 382/107, 103, 154; 345/419, 427
See application file for complete search history.

(56) References Cited

U.S. PATENT DOCUMENTS

| | | | |
|---|---|---|---|
| 6,526,156 B1 | 2/2003 | Black et al. | |
| 6,597,801 B1 | 7/2003 | Cham et al. | |
| 6,658,149 B1 | 12/2003 | Wakahara et al. | |
| 8,649,555 B1 | 2/2014 | Bregler et al. | |
| 8,666,119 B1* | 3/2014 | Mallet | G06T 19/00 345/419 |
| 2001/0005425 A1* | 6/2001 | Watanabe | G06T 17/00 382/154 |
| 2003/0035592 A1 | 2/2003 | Cornog et al. | |
| 2003/0219146 A1 | 11/2003 | Jepson et al. | |
| 2004/0051711 A1 | 3/2004 | Dimsdale et al. | |
| 2004/0068187 A1* | 4/2004 | Krause | A61B 17/15 600/443 |
| 2005/0033142 A1* | 2/2005 | Madden | A61B 5/0059 600/407 |
| 2005/0053275 A1* | 3/2005 | Stokes | G06T 7/529 382/154 |
| 2005/0280644 A1* | 12/2005 | Ikezawa | G06T 15/04 345/419 |
| 2006/0055706 A1* | 3/2006 | Perlman | A63F 13/06 345/589 |
| 2006/0187219 A1 | 8/2006 | Olhofer et al. | |
| 2007/0104351 A1* | 5/2007 | Yang | G06K 9/00342 382/103 |
| 2007/0183629 A1 | 8/2007 | Porikli et al. | |
| 2007/0211081 A1* | 9/2007 | Quadling | A61C 13/0004 345/632 |
| 2007/0222793 A1* | 9/2007 | Olhofer | G06T 17/30 345/619 |
| 2007/0226661 A1 | 9/2007 | Olhofer et al. | |
| 2008/0037829 A1* | 2/2008 | Givon | G06K 9/3216 382/107 |
| 2008/0043021 A1* | 2/2008 | Huang | G06T 13/00 345/428 |
| 2008/0170777 A1* | 7/2008 | Sullivan | G06T 7/33 345/475 |
| 2009/0009513 A1* | 1/2009 | van den Hengel | G06T 17/20 345/420 |
| 2009/0116732 A1* | 5/2009 | Zhou | H04N 13/0029 382/154 |
| 2009/0169053 A1 | 7/2009 | Vendrig | |
| 2009/0295793 A1* | 12/2009 | Taylor | G06T 13/20 345/419 |
| 2010/0039427 A1* | 2/2010 | Yun | G06T 11/001 345/419 |
| 2010/0082147 A1* | 4/2010 | Damvig | G05B 19/4099 700/119 |
| 2010/0134487 A1* | 6/2010 | Lai | G06T 17/00 345/419 |
| 2010/0164862 A1* | 7/2010 | Sullivan | G06K 9/3216 345/156 |
| 2011/0075922 A1 | 3/2011 | Turner et al. | |
| 2011/0182520 A1* | 7/2011 | Free | G06K 9/00241 382/195 |
| 2011/0285821 A1* | 11/2011 | Ogawa | H04N 21/6125 348/46 |
| 2012/0050478 A1* | 3/2012 | Karaoguz | H04N 13/0011 348/46 |
| 2012/0120054 A1* | 5/2012 | Sandrew | H04N 13/0267 345/419 |
| 2012/0165672 A1* | 6/2012 | Hill | A61B 8/0883 600/443 |
| 2012/0303839 A1* | 11/2012 | Jackson | G06F 3/011 710/15 |
| 2013/0120354 A1* | 5/2013 | Falco, Jr. | G06T 19/20 345/419 |
| 2013/0124148 A1* | 5/2013 | Jin | G06F 17/5086 703/1 |
| 2013/0169749 A1 | 7/2013 | Zhou et al. | |
| 2013/0208948 A1* | 8/2013 | Berkovich | G06T 7/215 382/103 |
| 2013/0286017 A1* | 10/2013 | Marimon Sanjuan | G06T 15/00 345/427 |

OTHER PUBLICATIONS

Author Unknown, "The Pixel Farm". The Pixel Farms 2003-2011. Accessed Sep. 26, 2011, 1 page Retrieved from: www.thepixelfarm.co.uk/product.php?productId=PFTrack&content=Features.

Blanz et al. "A Morphable Model for the Synthesis of 3D Faces", SIGGRAPH '99, Proceedings of the 26th Annual Conference on Computer Graphics and Interactive Techniques, 8 pages.

Bregler, C. "Learning and Recognizing Human Dynamics in Video Sequences", Proc. IEEE Conf. Comp. Vision and Pattern Recognition, San Juan, Puerto Rico, Jun. 1997, 8 pages.

Bregler et al. "Turning to the Masters: Motion Capturing Cartoons", ACM Transactions on Graphics (TOG)—Proceedings of ACM SIGGRAPH 2002, vol. 21 Issue 3, Jul. 2002 pp. 399-407.

Bregler et al. "Video Motion Capture", University of California, Berkeley, Technical Report No. UCB/CSD-97-973, Nov. 1997, 9 pages.

Cootes et al. "Active Appearance Models", IEEE Transactions on Pattern Analysis and Machine Intelligence, vol. 23 No. 6, Jun. 2001, pp. 681-685.

Gavrila et al. "3-D model-based tracking of humans in action: a multi-view approach", Computer Vision and Pattern Recognition, 1996. Proceedings CVPR '96, 1996 IEEE Computer Society Conference, Jun. 81-20, 1996, 8 pages.

Matthews et al. "Active Appearance Models Revisited", Journal International Journal of Computer Vision, vol. 60 Issue 2, Nov. 2004, pp. 135-164.

Manfred, L. "Face Poser: Interactive Modeling of 3D Facial Expressions Using Facial Priors", ACM Transactions on Graphics, vol. 29, No. 1, Article 3, Dec. 2009, 17 pages.

O'Rourke et al. "Model-Based Image Analysis of Human Motion Using Constraint Propagation", Pattern Analysis and Machine Intelligence, IEEE Transactions, vol. PAMI-2, No. 6, Nov. 1980, 15 pages.

Sucontphunt et al. "Interactive 3D Facial Expression Posing through 2D Portrait Manipulation", Graphics Interface Conference, May 28-30, 2008, pp. 177-184.

* cited by examiner

GEOMETRY TRACKING

CROSS-REFERENCE TO RELATED APPLICATIONS

This application is a Continuation U.S. patent application Ser. No. 13/306,572 entitled "GEOMETRY TRACKING", filed Nov. 29, 2011, the entire contents of which is herein incorporated by reference for all purposes.

TECHNICAL FIELD

This document relates to graphics processing.

BACKGROUND

Generally, video tracking is a process of locating one or more objects over time using cameras or video footage. The tracking can be done on objects that are in motion or rotation, or on stationary objects filmed by a moving or rotating camera, or both. One of the goals of video tracking is to track a single object in consecutive video frames. In some cases, the tracked objects may be marks worn by a subject specifically for the purpose of facilitating video tracking.

One application of video tracking is motion capture. In some motion capture procedures, a subject, often a human, is recorded from multiple viewpoints. Those videos can then be analyzed to identify computer-based coded representations of the subject. Motion data can be extracted from the representation, and can be, for example, applied to an animation model.

SUMMARY

In one aspect, a computer implemented method of motion capture includes receiving a first frame captured from a real 3D space. The first frame includes a first 2D image of a motion capture subject in the real 3D space. The method further includes deforming a 3D model into a first deformation and placing the deformed 3D model in a virtual 3D space in a first location so that the deformed 3D model corresponds to the first 2D image. The 3D model has at least one deformation constraint that restricts how the 3D model can be deformed. The method further includes receiving a second frame captured from the real 3D space. The second frame includes a second 2D image of the motion capture subject in the real 3D space. The method further includes tracking 2D changes in the second 2D image relative to the first 2D image. The method further includes projecting the 2D changes on the virtual 3D space as 3D constraints. The method further includes, based on the second 2D image, again deforming the 3D model into a second deformation and placing the 3D model in the virtual 3D space in a second location in conformance with the 3D constraints.

In one aspect, a motion capture system includes a geometry tracker configured to receive a first frame captured from a real 3D space. The first frame includes a first 2D image of a motion capture subject in the real 3D space. The geometry tracker is further configured to deform a 3D model into a first deformation and placing the deformed 3D model in a virtual 3D space in a first location so that the deformed 3D model corresponds to the first 2D image. The 3D model has at least one deformation constraint that restricts how the 3D model can be deformed. The geometry tracker is further configured to receive a second frame captured from the real 3D space. The second frame includes a second 2D image of the motion capture subject in the real 3D space. The geometry tracker is further configured to project, after tracking, 2D changes on the virtual 3D space as 3D constraints. The geometry tracker is further configured to, based on the second 2D image, again deform the 3D model into a second deformation and place the 3D model in the virtual 3D space in a second location in conformance with the 3D constraints. The system further includes a texture tracker configured to track, after receiving the second frame, the 2D changes in the second 2D image relative to the first 2D image In one aspect, a computer readable medium storing instructions that, when executed by one or more processing devices, cause the one or more processing devices to perform operations including receiving a first frame captured from a real 3D space. The first frame includes a first 2D image of a motion capture subject in the real 3D space. The operations further include deforming a 3D model into a first deformation and placing the deformed 3D model in a virtual 3D space in a first location so that the deformed 3D model corresponds to the first 2D image. The 3D model has at least one deformation constraint that restricts how the 3D model can be deformed. The operations further include receiving a second frame captured from the real 3D space. The second frame includes a second 2D image of the motion capture subject in the real 3D space. The operations further include tracking 2D changes in the second 2D image relative to the first 2D image. The operations further include projecting the 2D changes on the virtual 3D space as 3D constraints. The operations further include, based on the second 2D image, again deforming the 3D model into a second deformation and placing the 3D model in the virtual 3D space in a second location in conformance with the 3D constraints.

Implementations can include any, all, or none of the following features. The 3D constraints apply to at least a location and a deformation in which the deviation of the 3D model is at a minimum. Again deforming the 3D model and placing the 3D model in the virtual 3D space is performed in a single use of a non-linear solver. Deforming a 3D model and placing the deformed 3D model in a virtual 3D space so that the deformed 3D model corresponds to the first 2D image is based on use input. After again deforming the 3D model and placing the 3D model in the virtual 3D space in conformance with the 3D constraints, refining the tracking of 2D changes in the second 2D image relative to the first 2D image using texture tracking constraints based on the second location. The texture tracking constrains are further based on the second deformation. A refined location and a refined deformation of the 3D model in the virtual 3D space is determined, for the second frame, based on the refined locations of the texture in the second 2D image. Again deforming the 3D model includes solving for control values for one of an animation rig that defines non-linear relationships between at least some of the control values and rig deformation. The animation rig includes at least one of a facial rig, a body rig, or a blend shape. The tracking of 2D location changes of textures are refined by identifying subsections of textures and tracking 2D location changes of the subsections in the first 2D image to the second 2D image. Accessing one or more reference frames, each reference frame showing the motion capture subject; and tracking 2D changes in the second 2D image relative to the first 2D image includes using a reference frame as a key frame specifying texture locations in a future frame of the motion capture video. Tracking 2D changes in the second 2D image relative to the first 2D image includes: identifying the location of an occlusion object that indicates an occlusion of textures in the second 2D image; and ignoring textures in the second 2D image that overlap a projection of the occlusion object in the second 2D image. Reading a plurality of first camera parameters for the first frame, the first camera parameters corresponding to the physical state of a real camera when the real camera recorded the first frame; and determining a plurality of second camera parameters for the second frame, the second camera parameters corresponding to the physical state of the real camera when the real camera recorded the second frame. After determining a new location and a new deformation for the 3D model, a freeform deformation is determined to be applied to the 3D model; and adding the freeform deformation to the new deformation.

Various implementations of the subject matter described here may provide one or more of the following advantages. Tracking geometry can permit motion capture based on video captured from a single viewpoint. Accessing model location, orientation, and shape information can provide constraints to aid in the identification of texture movements in a video. Accessing model information can reduce the user input needed to track textures in a video. Tracking geometry can permit accurate estimation of a surface deformation.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

A geometry tracker may use a constrained tracking framework to track the location, orientation, and shape of an object in a video sequence for matchmove, motion capture, or other uses. The geometry information may be used, for example, in a motion capture phase of a moviemaking project to capture the motion of a dynamic subject including, but not limited to a human actor. Some implementations use a hybrid 2D/3D approach for tracking an object through a video sequence despite the object being deformed and/or undergoing appearance changes. For example, a three-dimensional model (3D) representing the subject can be tracked from frame to frame in the video; a texture tracker can track the apparent movements of texture regions; and those movements can be used as constraints to solve for movements and deformations of the subject. The texture tracker can track the overall object's appearance as a texture, optionally without the aid of special markers (e.g. cosmetic dots) or feature identification (e.g. user selection of eye corners).

The three-dimensional model can be used as an aid in tracking the textures, allowing for efficient tracking of textures and identification of, for example, expected occlusions. Additionally, camera parameters may be calculated. For example, a stationary object (e.g. a fixed part of scenery) recorded by a moving camera can appear to move and change shape and size in the recording. The relative change is position and orientation of the object can be used to find the actual movement and rotation of the camera, if the stationary object is held constant in 3D space.

Figure 1:
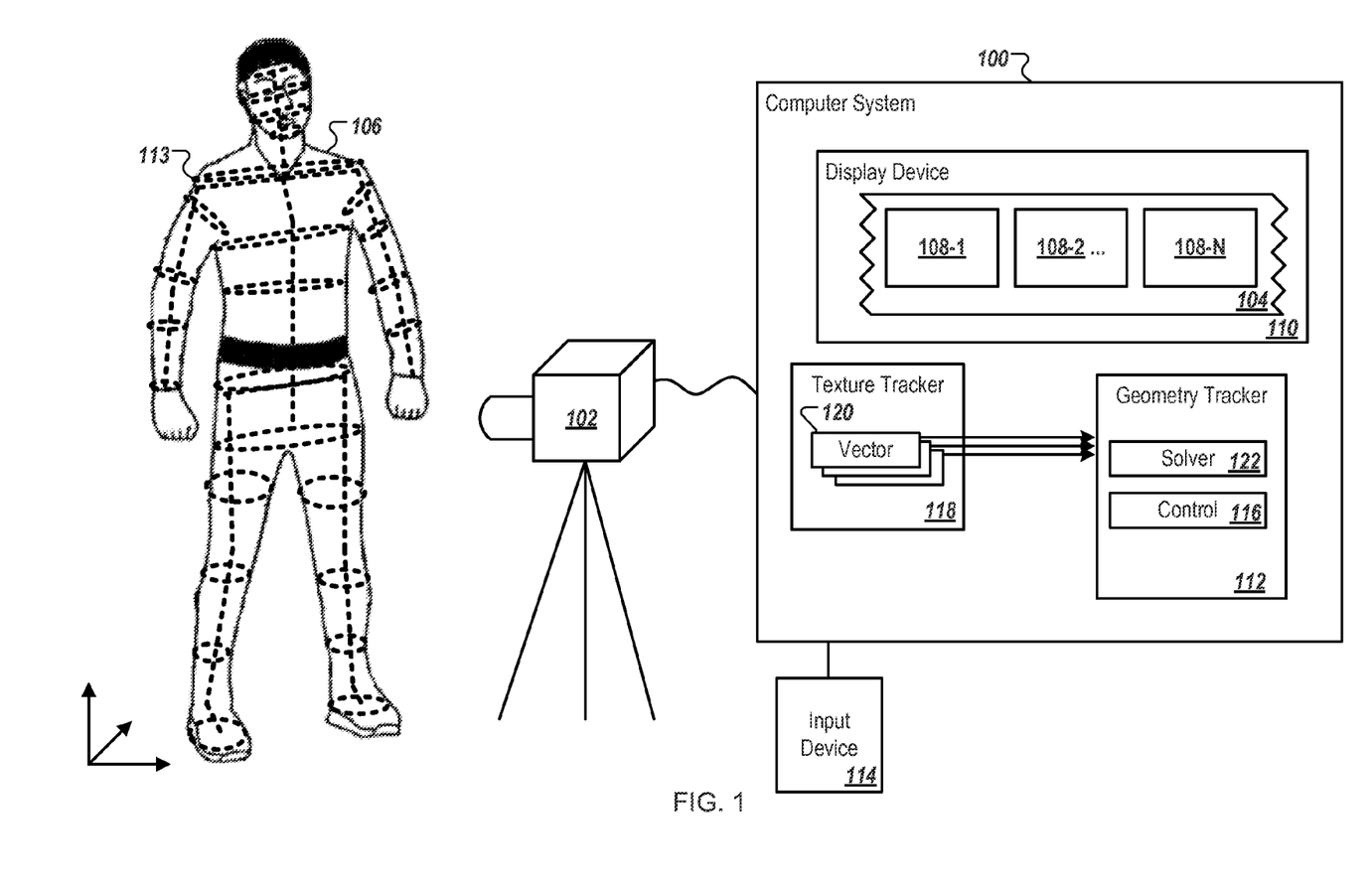
FIG. 1 includes an example system that can be used to track geometry in a video sequence.

FIG. 1 includes an example system 100 that can be used to track geometry in a video sequence. In some implementations, the system 100 can perform facial and/or body motion tracking Here, the system 100 includes a camera 102 that captures a video sequence 104 of an actor 106 performing a motion. The video sequence can include multiple frames 108, here schematically illustrated as frames 108-1, 108-2 . . . , 108-N. Shown here, the actor 106 is wearing unmarked clothing and is not marked. However, in some implementations, the actor 106 and/or the actor's 106 clothing may have markings that may aid in motion capture processing. These marking can include, but are not limited to, textured clothing, make up, and motion capture markers.

Any suitable kind of camera can be used to capture the video sequence, including, but not limited to a digital camera, movie camera, rangefinder camera, video camera or view camera. For example, the camera 102 can capture the video sequence 104 in a digital format so that any and all of the frames 108 can be stored in a suitable image format and handled individually. Example digital formats include, but are not limited to QuickTime File Format (.mov), JPEG 2000 (.mj2 or .mpj2), and OpenEXR (.exr).

The system 100 here includes a display device 110 for presenting any or all of the frames 108 to a user. In some implementations, the playback for the video may be at normal speed, or faster or slower, or frame-by-frame. Any suitable kind of display device can be used, including, but not limited to a computer monitor, television, movie projector or handheld device. In some implementations, presenting the frame(s) can allow the user to see one or more body deformations by the actor 106 in performing the motion, including, but not limited to the actor's facial expression or body poses. Additionally, movements of stationary objects, for example resulting from movement of the camera 102, can also be shown.

The system 100 here includes a texture tracker 118 that can track features associated with the video sequence 104. Textures borne by the actor 106 can be tracked as they move in the image plane defined by the frames 108, creating a collection of motion vectors 120 for each frame 108. The motion vectors are two-dimensional (2D) vectors that can define the movement of a texture section in the image plane of the frames 108. In some cases, texture subsections can be identified within a subject's texture, and each of the subsections may be tracked. This subsectioning can result a denser vector map for textures in the frame 108. For example, a subject's face may be tracked. The lighting on the subject may create areas of dark shadow and comparatively brighter highlights. The subject's face may be subsectioned according to the illumination differences, and each subsection may be tracked. In this example, this may permit more accurate tracking of each subsection, as the variance of illumination of each subsection may be less that the overall variance of illumination of the subject's face.

The system 100 here includes a geometry tracker 112 that can be used to track the location and shape of a three-dimensional model 113. For clarity of description, the 3D model 113 is here shown superimposed over the actor 106 in dashed lines. The 3D model 113 can be a data structure that includes a group of 3D vertices connected by edges into a triangular mesh. Each triangle in the mesh may have an associated face with, for example, a color value and texture. Taken as a whole, the 3D model 113 can have a shape and appearance generally analogous to the actor 106.

The three-dimensional model 113 can represent, in a virtual three-dimensional space, the actor 106 (or any other subject of the video sequence 104) substantially according to the actor's position and movement in real three-dimensional space. The 3D model 113 may include an animation rig designed to be controlled with a group of rig controls. The rig controls can drive the 3D model, deforming the 3D model into a rage of poses or expressions that may be expressed by the actor 106. The geometry tracker can use the solver 112 to solve for values of control 116 that cause the 3D model to assume a shape defined by constraints that are based on the vectors 120.

In some implementations, the face of the actor 106, and/or another body part, can be tracked in three dimensions by adapting a deformable mesh of the 3D model 113 to fit the video sequence. To build a mapping of the 3D model 113 to the actor 106, the system 100 can receive input from a user describing the mapping. The system 100 here includes an input device 114 for receiving an input that the user enters upon viewing the frame(s) 108. In some implementations, the input device 114 can include, but is not limited to a keyboard and/or a pointing device (e.g. a mouse). Using the input device(s) 114, the user (e.g., an artist) can set up the mapping between motion features and animation controls based on a subset of frames from the video. For example, the artist can select representative frames based on the actor's body deformation (e.g., a facial gesture or pose). Such deformation(s) can then be translated into a corresponding configuration of the three-dimensional model 113, for example a happy, sad, excited or angry expression, or any other emotion. The artist can select a frame anywhere in the sequence as being representative, for example toward the beginning, in the middle, and/or toward the end of the sequence. For each of these representative frames, the user can set the location, orientation, and shape of the model 113 in virtual three-dimensional space so that they correspond to the location, orientation, and shape of the actor in real three-dimensional space.

Once a mapping has been learned from one or more examples, the system 100 can solve for control values (e.g., rig control values for the three-dimensional model 113) that correspond to the vectors 120 from the texture tracker 118. In some implementations, some rig controls for the animation rig of the three-dimensional model 113 can produce non-linear deformations to the three-dimensional model 113. For example, enveloping or skinning features of the three-dimensional model 113 can involve rotations applied to the three-dimensional model 113 Any appropriate type of solver can be used in various implementations. Example solvers can include, but are not limited to, nonlinear least-squares, Levenberg-Marquardt, and conjugate gradient solvers. In some implementations, linear solvers are incapable of solving for these control values, due to the non-linear relationship that may exist between control parameter values and deformations. In some implementations, the geometry tracker 112 can use a single solver 112 to determine the control values. In other implementations, multiple solvers 122 to determine the control value(s). For example, a cascade of solvers can be used for different parts of the actor's body, including, but not limited to for regions of the face. As another example, the solver(s) 122 can use one or more filters for temporal filtering, including, but not limited to a Gaussian or a bilateral filter. The solver 122 can also be used to determine the location of the three-dimensional model 113 in virtual space, as well as the camera parameters of the camera 102 when the video sequence 104 was recorded. In some implementations, this solving may be performed by the solver 122 as a part of solving for the deformations.

Two-dimensional tracking of features and/or contours by the texture tracker 118 can provide detailed local motion information about the actor's body, or part thereof. However, such information may not accurately capture rigid head motions, including, but not limited to a head rotation. For example, as the head of the actor 106 rotates, the face of the actor 106 may change expression. The combination of these two changes may result in tracking data that is ambiguous with respect to the source of the total change. With three-dimensional tracking by the geometry tracker 112, rigid motion of the actor's head can be factored out in the texture tracking.

The following is an example of how the texture tracker 118 can operate. The camera 102 can capture the video sequence 104 of the actor 106, including the frames 108-1 and 108-2. As the first frame in the video sequence 104, the location, orientation, and shape of the three-dimensional model 113 and the camera parameters can be set by a user. When processing the vectors 120 for frame 108-2, the texture tracker 118 can use the camera parameters and the location, orientation, and shape of the three-dimensional model 113 in frame 108-1 to create constraints on texture motion for the frame 108-2. For example, if the actor 106 is rotating his or her head in frames 108-1 and 108-2, occlusions caused by the nose of the actor in the frame 108-1 can be used as constraints that, effectively, determine that some textures near the nose should be occluded in the frame 108-2. Similarly, some constraints may describe rigid relationships between textures. For example, textures on the forearm of the actor 106 may be constrained to a small range of distances from each other, reflecting the fact that the actor's forearm 106 is nearly rigid.

Figure 2:
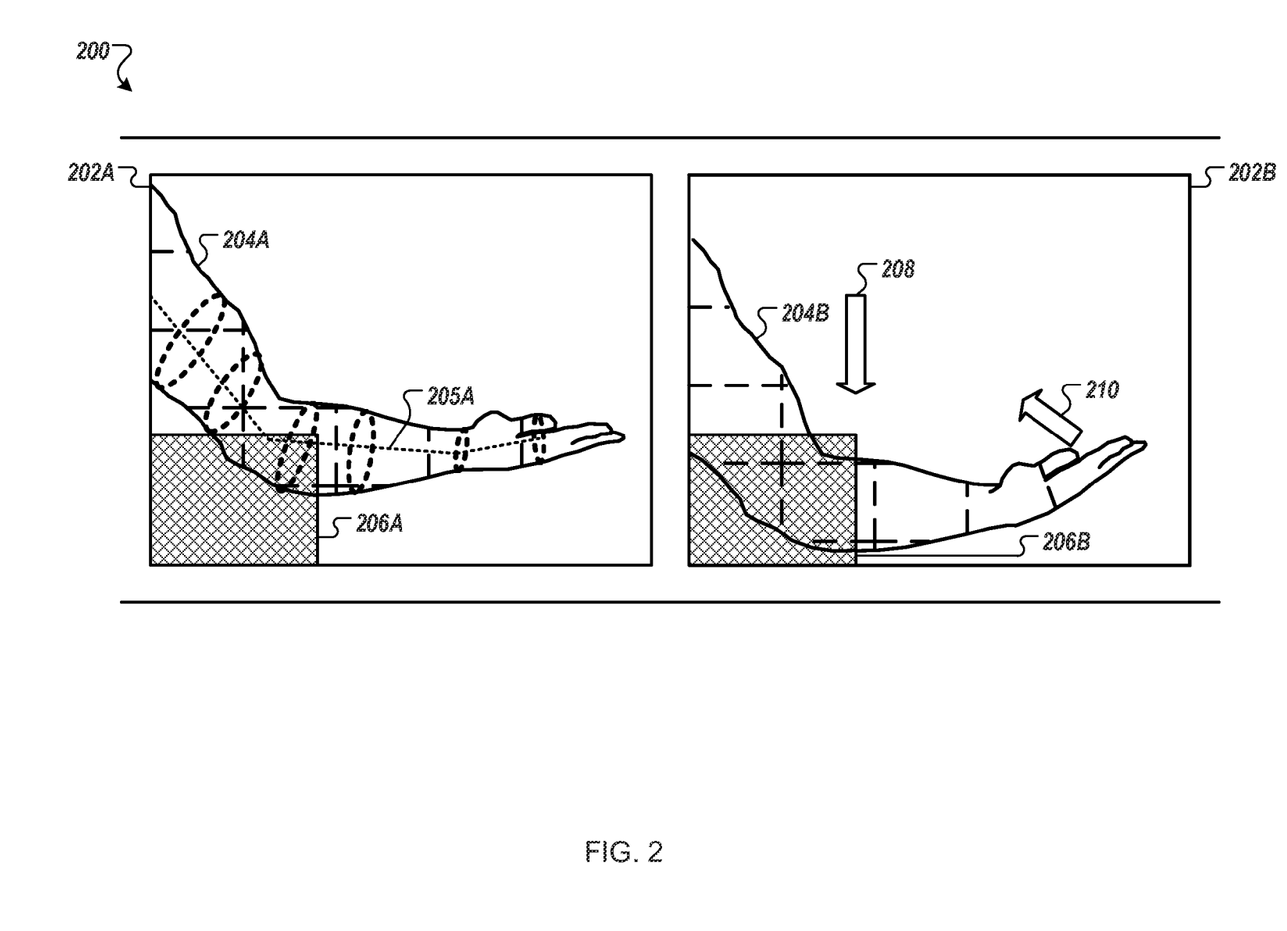
FIG. 2 is a schematic diagram of an example video in which textures are tracked.

FIG. 2 is a schematic diagram of an example video 200 in which textures are tracked. The video 200 includes a series of frames 202, each frame containing, for example color or shading values in a two-dimensional image plane. Here, the video shows part of a person's arm 204. The color values can be grouped into textures in the frames 200 where objects are visible. For example, the arm 204 may have one texture or a set of textures, and an occlusion object 206 may have a different texture or set of textures.

In the video 200, the location of the textures of the arm 204 is to be tracked from the frame 202A to 202B. The location, shape, and orientation of the arm 204A in the frame 202A may be known and represented by a model 205A (for clarity, shown in FIG. 2 superimposed over the arm 204A in dashed lines). The location, shape, and orientation of the model 205A may be, for example, based on user input to initialize the video 200 or on previous automated processing of the video 200 using earlier frames.

The occlusion object 206 represents an object in the video 200 that occludes portions of the arm 204. The occlusion object 206 can be a three-dimensional object that, for example, the texture tracker 118 can use as a source of reference when tracking textures. Texture-tracking constraints can be created based on the location of the occlusion object 206 (e.g. textures in the frame 202A around the occlusion object 206A may be occluded in the frame 202B).

In some examples, the occlusion object 206 can be created and placed by a user to represent an object in the video 200 that does not have a corresponding three-dimensional model that is tracked. In other examples, the occlusion object 206 may be a three-dimensional model similar to the model 113 that is tracked in the video 200.

From the frame 202A to 202B, the arm 204 moves downward in the video 200, and the wrist bends, rotating the hand. As shown, the arm 204A is in a higher position in the frame 202A than the arm 204B in the frame 202B. Also, the shape of the arm 204B is different than the shape of the arm 204A. More of the arm 204B is occluded by the occlusion object 206B than the arm 204A is occluded by the occlusion object 206A. The occlusion object 206 does not change location, orientation, or shape in this example, through that is possible in other examples.

If the entire arm 204 is tracked as a single unit, a vector 208 can represent the movement of the texture of the arm 204 from the frame 202A to 202B. In some implementations, the arm 204 can be partitioned into subsections, and textures for each subsection can be tracked. In some cases, subsection texture tracking can be an iterative process. That is, after the vector 208 is found, the arm 204 can be partitioned, and vectors for each subsection can be found. This partitioning process can be performed a number of times, for example until partitions reach a minimum size or for a predetermined number of times. Partitions shown for the arm 204 are regular, rectangular shapes. Other shapes are possible. For example, for a human face, smaller partitions may be used around the eyes and mouth to capture subtle details and large partitions may be used around the head and neck. Additionally, the vector 208 can be constrained by aspects of the model 205A. For example, since the model 205A represents a human arm, a limit to the magnitude of the vector 208 may be set to represent the maximum speed a human can move from one frame to the next.

For each of the subsections in the arm 204B, a vector can be calculated. For some subsections that do not change shape, including, but not limited to those near the shoulder of the arm 204, the newly calculated vector may be the same as or similar to the vector 208. For some other subsections, including, but not limited to those in the hand, the newly calculated vector 210 may differ from the vector 208. In this example, this is because the shape of the arm 204B is different than the shape of the arm 204A. Although only the vector 210 is shown, a vector may be calculated for each subsection. The vector 210 may be constrained by the model 205A. In this example, the model 205A includes a rig constraint on the angle that the wrist can bend, as well where the wrist is on the model. In some cases, errors in the texture tracking may indicate a bend that occurs at a slightly different location, and this constraint would ensure that the tracking conforms to deformations that are possible by the model 205A.

Figure 3:
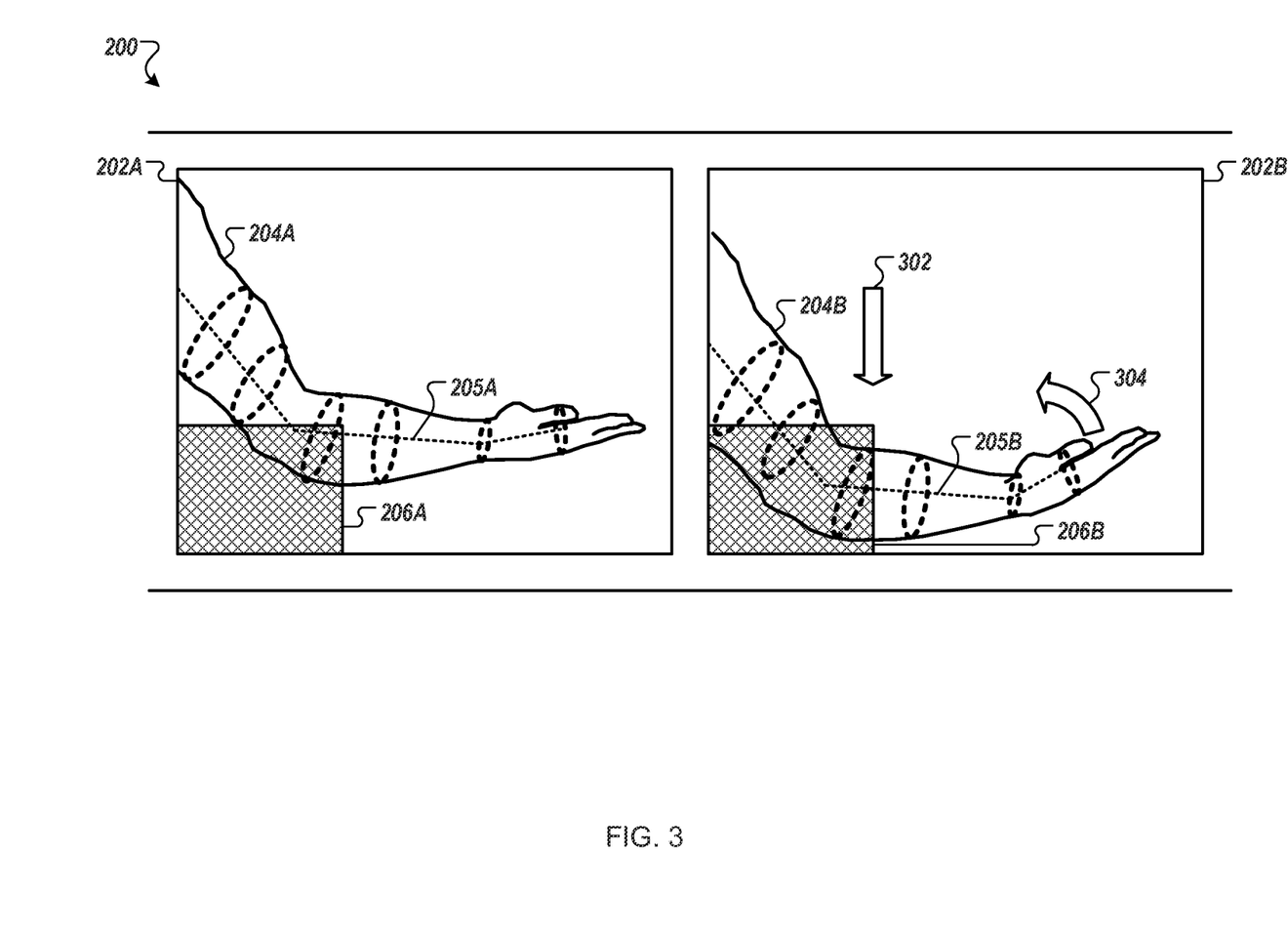
FIG. 3 is a schematic diagram of an example video in which the location, orientation, and shape of a model is calculated.

FIG. 3 is a schematic diagram of the example video 200 in which the location, orientation, and shape of a model is calculated. In this example, the model is the model 205A mentioned above. Here, the location, orientation, and shape of a model 205B are found in a virtual three-dimensional space for the frame 202B so that the model 205B matches the location, orientation, and shape of the arm 204B in real three-dimensional space.

The location, orientation, and shape of the model 205A are copied and applied to the model 205B. Next, the vectors 208 and 210 (FIG. 2) may be applied as constraints. The model 205B can be rotated, translated, and deformed to minimize the values of those constraints; that is, to find the location, orientation, and shape of the model 205A once the vectors 208 and 210 have been applied.

In some implementations, solving for the location and orientation of the model 205B can involve using the vectors 208 and 210 (FIG. 2) to determine three-dimensional translation and rotation values to be applied to the model 205A. In this example, a translation 302 is applied to the model 205A, and no rotation is applied.

In some implementations, solving for the shape of the model 205B can be accomplished by solving for control values for a facial rig, a body rig, or a blend shape, depending on the type of model that the model 205B is. In this example, rig values are solved for which can rotate the hand of the model 205A in an arc 304.

For a facial rig, controls may be associated with muscles or muscle groups, and the control parameters control the expression of the face. For example, a control or controls for occipitofrontalis muscle can cause the rig to raise the eyebrows and wrinkle the forehead. For a body rig, each joint may have one or more associated controls that drive the shape of that joint. For example, a wrist angle control for an arm may drive the angle between the model's hand and forearm. For models with blendshapes, control values drive the rig to be more or less like a particular shape. For an example box with a hinged lid, one blendshape may be the box with the lid fully open and another blendshape may be the box with the lid fully closed. A blendshape value between 0 and 1 can weigh those two shapes to set the box lid to any angle between open and closed.

Figure 4:
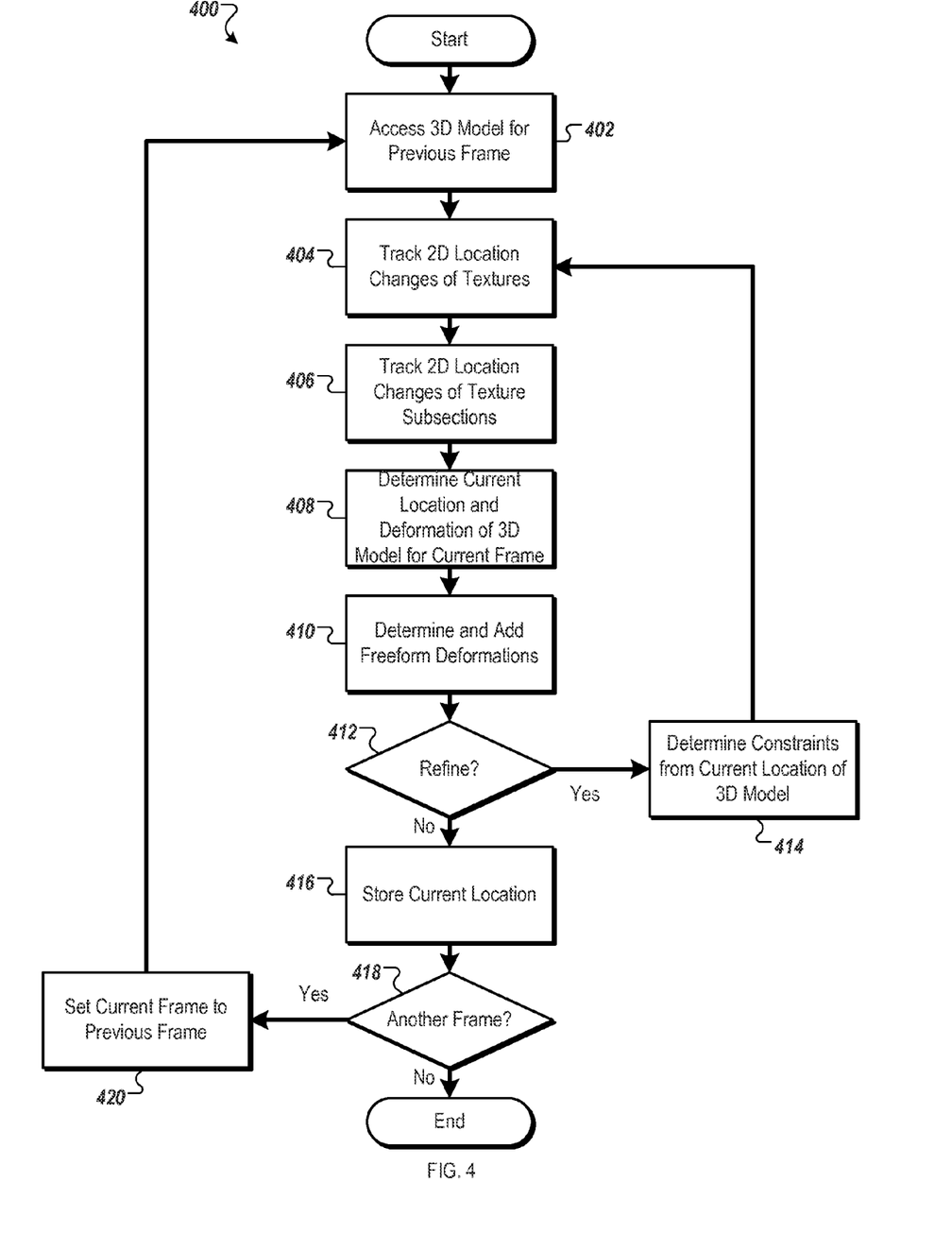
FIG. 4 is a flowchart of an example process of tracking geometry in a video.

FIG. 4 is a flowchart of an example process 400 of tracking geometry in a video. The process 400 can be performed by a processor executing instructions in a system including, but not limited to the system 100, and for illustrative purposes will be described with reference to the system 100 (FIG. 1). However, other systems may perform the process 400.

To process a current frame, the information of the previous frame and/or user-set reference frames may be accessed. A previous location and a previous deformation of a three-dimensional model is accessed (402). The location defines the models position in a virtual three-dimensional space for a previous frame of a motion capture video. The location of the three-dimensional model corresponds to a location in actual three-dimensional space of a motion capture subject in the previous frame. For example, the system 100 can record a video of the actor 106, object, or scene. The three-dimensional model 113 can include, but is not limited to a mesh or animation rig, and can represent the object. Similarly, the location, orientation, and shape of the three-dimensional model can be set by the motion capture system to match the location, orientation, and shape of the motion capture subject in real space for some of the frames of the video. In some implementations, the information of the previous frame may be user defined, as further described in FIG. 5.

Additionally, camera parameters for the previous frame may be accessed. These camera parameters may define, for example, the location and orientation of the camera in the same virtual three-dimensional space as the three-dimensional model. Other parameters can include, but are not limited to, focal lengths, motion blur factor, distortion factor, etc.

Two-dimensional location changes of textures are tracked in an image plane from the previous frame to a current frame, the textures being displayed by the motion capture subject (404). For example, the two-dimensional translation of texture areas from the previous frame to the current frame can be determined by the texture tracker 118. Some example process for this are described in U.S. application Ser. No. 12/607,480 "VISUAL TRACKING FRAMEWORK", the entire contents of which are incorporated herein by reference.

Tracking two-dimensional location changes of textures in the image plane from the previous frame to the current frame includes identifying the location of an occlusion object that indicates an occlusion of the textures. Textures in the image plane that overlap a projection of the occlusion object in the image plane are ignored. For example, the occlusion object may be identified in the three-dimensional virtual space by a user to aid in the tracking of two-dimensional texture tracking These occlusion objects can represent real objects that are interposed between the motion capture subject and the camera at the time of filming. Additionally, the occlusion objects can include objects whose motion is being tracked by the process 400. For example, one part of an actor (e.g. the actor's arm) may occlude another part of the actor (e.g. the actor's torso) in the previous or current frame, and the occluding part of the actor can be considered an occlusion object. Textures near or at a point in the image plane overlapping with a two-dimensional projection of the occlusion object on the image plane may be ignored or otherwise handled to take into account the possible occlusion.

The tracking of two-dimensional location changes of textures is refined by identifying subsections of textures and tracking two-dimensional location changes of the subsections in the image plane from the previous frame to the current frame (406). For example, deformations of the actor 106 in the current frame from the previous frame may be tracked by identifying and tracking subsections of the textures of the actor 106. This subsection tracking may be recursive—that is, it may be repeated a number of times using progressively smaller subsections. In some cases, the subsection tracking may be repeated for a predetermined number of times, until a subsection is reduced to a particular size, until a particular number of subsections are identified, or until the tracking confidence falls below a threshold.

For the current frame, a current location and deformation of the three-dimensional model in the virtual three-dimensional space is determined based on locations of the texture in the image plane of the current frame (408). Rotation and translation vectors for the three-dimensional model 113 can be solved from the texture location changes. The two-dimensional movement vectors of the textures in the current frame may be used as constraints when solving for the rotation and translation vectors. For example, rotation and translation values that cause the surfaces of the three-dimensional model 113 to move according to two-dimensional movement vectors of associated texture sections, when projected onto the view plane of the current frame, may be solved for.

Determining the deformation can include solving for control values for one or more of a facial rig, a body rig, or a blend shape. For example, control values may be solved for that cause the three-dimensional model 113 to deform into a shape that, when projected onto the view plane of the current frame, the three-dimensional model 113 surfaces are in the same or nearly the same location as the associated textures. Alternatively, other types of deformations may be used. For example, the two-dimensional texture vectors may be projected into the three-dimensional space of the three-dimensional model 113, and a deformer including, but not limited to a Laplacian deformer, a blendshape weighting or rig control adjustment can be used to deform the model. In some cases, the actions 408 and 410 may be performed as part of a single set of calculations.

Further, the camera parameters for the current frame can be solved for. For example, the apparent movements of stationary objects in the current frame may be used as reference points from which motion of the camera can be determined, and the apparent blurring of sharp edges can be used to determine focal length and motion blur.

Solving for the current location, deformation, and camera parameters may be performed with a single use of a non-linear solver. For example, variable values for each degrees of freedom of the three-dimensional model (e.g. the control values of an animation rig) and for each degree of freedom of location (e.g. six values, three for location and three for orientation) and for each camera parameter may be solved for with a non-linear solver. The non-linear solver solves for values for each variable that results in a location, a deformation, and camera parameters that matches or most closely matches the constraints of the frame. In some implementations, the actual number of variables used or solved for can be reduced or bounded (e.g. limiting maximum or minimum values) based on constraints of the three-dimensional model. For example, an animation model based on rigid human can be constrained based on human physiology. For example, the angles of joints can be limited to angles possible in real human movements. Described here are two example three-dimensional models with deformation constraints (e.g rig constraints, joint limits, elasticity constraints). First, a model based on a human has deformations that can apply to rigid motion (e.g. skeletal movement) and non-rigid motion (e.g. the face). The rigid motion contains thirty joints, with each joint described by six parameters (three for location, three for orientation) for a total of one hundred eighty parameters. The human model further has a facial animation rig that is controllable with sixty to one hundred twenty animation controls for three hundred to five hundred corrective shapes and joints. This model may have approximately four hundred parameters, some or all of which have a non-linear relationship with the deformations applied to the three-dimensional model as a result of the parameter values. Additionally, the camera in this example may have ten parameters, for a total one two hundred fifty parameters. However, some of the parameters may be eliminated and/or bounded, based on deformation constraints associated with the three-dimensional model. In this case, approximately one hundred parameters may be solved for with the non-linear solver.

In the second example, a model is based on a deformable amorphous solid or liquid (e.g. gelatin or lava). In this model, the number of parameters is the number of vertices of the model mesh multiplied by three location parameters. As the size or resolution of the mesh changes, so would the number of parameters. The parameters may be reduced or bounded based on deformation constraints associated with the model. For example, a smoothness constraint may be designed to enforce a particular smoothness of the model to eliminate jagged edges, and an elasticity/plasticity constraint may specify that each vertex much be within a particular distance of each neighboring vertex to prevent the model from sheering or 'exploding.' Each of these constraints may be represented by bounded or eliminated parameters.

Freeform deformations are determined and added to the deformation (410). In some implementations, location and deformation values may be solved for that do not perfectly align with the two-dimensional location changes constraints that are found. This discrepancy may be a product of, for example, imperfect texture tracking, flaws in the three-dimensional model (e.g. applying constraints for a 'normal' human to a model representing an particularly athletic subject) or mathematical flaws (e.g. rounding or imprecision errors caused by underlying system limitations).

To correct for some of these imperfections, freeform deformations may be found and applied. In some implementations, the freeform deformations may take the format of location change parameters applied to vertices of a mesh of the three-dimensional model. These freeform deformations may ignore some or all of the control values of a rig driving the mesh, or deformation constraints applied to the three-dimensional model. In some examples, adding the freeform deformations to the deformations already determined can produce deformations that are not possible by just solving for parameter values with the non-linear solver. One process for determining the freeform deformation involves using a Laplacian deformer. Another process is involves receiving input from a user manually adjusting one or more vertices.

The current location, orientations, and/or shape of the three-dimensional model, as well as the camera parameters, may be refined (412). For example, the actions 404-410 can be performed a predetermined number of times, or they can be repeated until the difference between the location of the projection of the three-dimensional model 113 and the tracked textures falls below an error threshold.

The tracking of two-dimensional location changes of textures is refined using constraints based on the current location of the three-dimensional model (414). For example, in the actions 404 and 406, the current location of the three-dimensional model 113 in the current frame may be used as an occlusion object, and constraints based on the geometry or anatomy of the model 113 may be imposed on the steps 404 and 406.

Data representing the current location and current deformation is stored on a computer readable medium (416). For example, once the location, orientation, and shape of the three-dimensional model 113 is determined for the current frame, data describing such location, orientation, and shape may be stored in association with the current frame. For example, a location in the three-dimensional space, a rotation matrix, and control values may be saved with a frame number in a database on a computer hard disk.

If additional frames are available (418), the next frame may be processed by setting the current frame to be the previous frame, and the next frame to be the current frame (420). Then, the process 400 can begin again at action 402 for the new current frame and can repeat until the video, or a section of the video, is processed.

Figure 5:
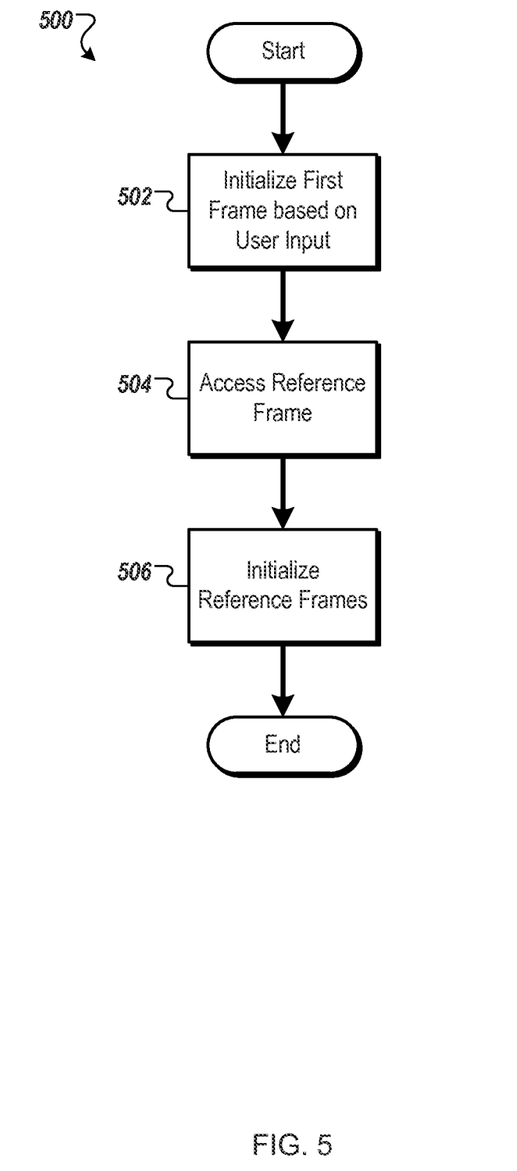
FIG. 5 is a flowchart of an example process of initializing data for a video with geometry to be tracked.

FIG. 5 is a flowchart of an example process 500 of initializing data for a video with geometry to be tracked. In some implementations, the process 500 can be used to initialize or preprocess a video that is to be processed for motion tracking by the process 400 (FIG. 4). The process 500 can be performed by a system including, but not limited to the system 100, and for illustrative purposes will be described with reference to the system 100 (FIG. 1). However, other systems may perform the process 500. The process 500 may be performed before the process 400. For example, the process 500 may be used to preprocess 402 to match the location, orientation, and shape of the motion capture subject in real space for some of the frames of the video A frame is initialized by placing the three-dimensional model at the previous location in the three-dimensional according to use input (502). For example, the first frame of a video may be initialized in the action so that the second frame, when processed in the process 400, has a previous frame with a three-dimensional model's location, orientation, and shape information.

In some implementations, system 100 can initialize the frame by providing a user with an interface to select, place and deform the three-dimensional. Using the input device 114, the user can select the three-dimensional model 113 to match the actor 106. Still using the input device 114, the user can move, orient, scale, and deform the three-dimensional model 113 so that the models' projection on the initialized frame's image plane matches the location, orientation, and shape of the actor 106 on the image plane. From this setting, the system 100 can determine, for example, camera parameters like the distance between the camera 102 and the actor 106.

One or more reference frames are accessed (504). Each reference frame shows the motion capture subject. For example, the user can use the input device 114 to identify reference frames. The reference frames may show the actor 106 in an extreme pose, emotion, or location. In another example, periodic frames (e.g. every one hundred frames, or one frame ever minute) may be identified as reference frames.

The reference frames are initialized (506). For example, the references frames may be initialized as the frame is in the action 502. In other examples, automated processes, including, but not limited to minimum root mean square solving, can be used to initialize the reference frames.

In the process 400, the actions 404 and 406 can include using a reference frame as a key frame specifying texture locations in a future frame of the motion capture video. For example, texture movements and three-dimensional model movements and deformations can be calculated using the previous frame and the next reference frame as key frames. The key frames, for example, can provide locations in the image plane that can be used as constraints on those calculations.

Figure 6:
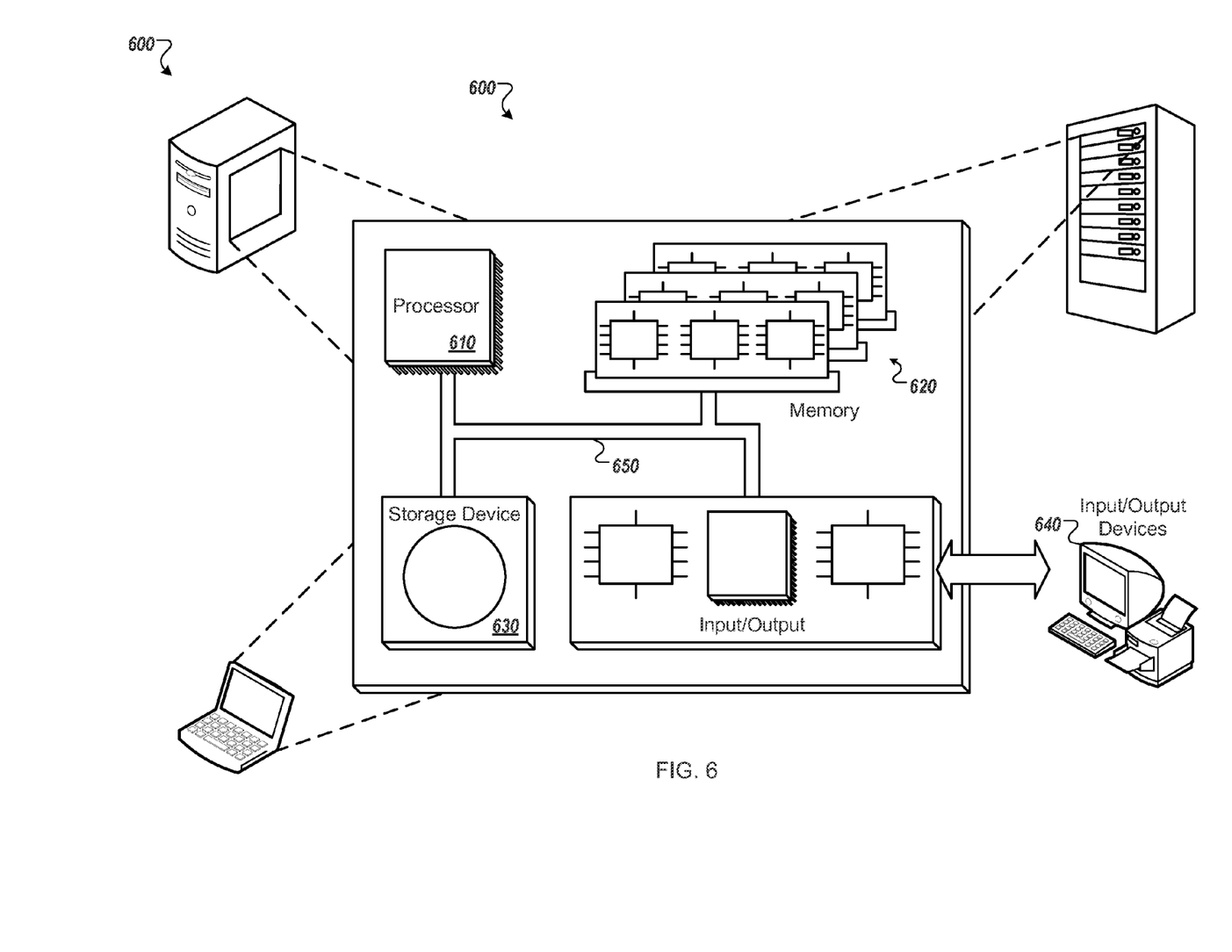
FIG. 6 is a block diagram of a computing system that can be used in connection with computer-implemented methods described in this document.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer implemented method of motion capture, the method comprising:
   accessing a 3D model;
   associating the 3D model with a 2D representation of a subject in a plurality of frames, wherein the plurality of frames captures the subject in a real 3D space;
   identifying one or more motion vectors derived from a change to the position of the 2D representation of the subject between two or more of the plurality of frames; and
   deforming the 3D model in a virtual 3D space, wherein the deforming is based on:
      the identified change to the position of the 2D representation; and
      at least one constraint restricting how the 3D model can be deformed,
   wherein the at least one constraint comprises the one or more motion vectors.

2. The computer implemented method of motion capture of claim 1, wherein each frame in the plurality of frames comprises a 2D image of the subject in a real 3D space.

3. The computer implemented method of motion capture of claim 1, further comprising projecting the identified change onto the virtual 3D space as 3D constraints.

4. The computer implemented method of motion capture of claim 1, wherein deforming the 3D model in the virtual 3D space is performed in a single use of a non-linear solver.

5. The computer implemented method of motion capture of claim 1, identifying a change to the 2D representation of the subject is based on texture tracking.

6. The computer implemented method of motion capture of claim 1, wherein deforming the 3D model in the virtual 3D space comprises solving for control values for an animation rig that defines non-linear relationships between at least some of the control values.

7. The computer implemented method of motion capture of claim 6, wherein the animation rig comprises one or more selections from the group consisting of: a facial rig, a body rig, and a blend shape.

8. The computer implemented method of motion capture of claim 1, wherein identifying the change to the 2D representation of the subject comprises identifying subsections of textures and tracking 2D location changes of the subsections in a first frame relative to a second frame.

9. The computer implemented method of motion capture of claim 1, further comprising:
   accessing one or more reference frames in the plurality of frames, each reference frame showing the subject; and
   tracking 2D changes in a second frame relative to a first frame includes using a reference frame as a key frame specifying texture locations in a future frame during the motion capture.

10. The computer implemented method of motion capture of claim 1, wherein identifying a change to the 2D representation of the subject between two or more of the plurality of frames comprises:
  identifying a location of an occlusion object that indicates an occlusion of textures in a frame; and
  ignoring textures in the frame that overlap a projection of the occlusion object in the frame.

11. The computer implemented method of motion capture of claim 1, further comprising:
  reading a plurality of first camera parameters for a first frame in the plurality of frames, the first camera parameters corresponding to a physical state of a real camera when the real camera recorded the first frame; and
  determining a plurality of second camera parameters for a second frame in the plurality of frames, the second camera parameters corresponding to a physical state of the real camera when the real camera recorded the second frame.

12. The computer implemented method of motion capture of claim 1, further comprising:
  determining a freeform deformation to be applied to the 3D model; and
  adding the freeform deformation to the 3D model.

13. A motion capture system, the system comprising:
  a geometry tracker configured to:
    access a 3D model;
    associate the 3D model with a 2D representation of a subject in a plurality of frames, wherein the plurality of frames captures the subject in a real 3D space; and
    deform the 3D model in a virtual 3D space, wherein the deforming is based on:
      an identified change to the position of the 2D representation; and
      at least one constraint restricting how the 3D model can be deformed, wherein the at least one constraint comprises one or more motion vectors; and
  a texture tracker configured to:
    identifying the one or more motion vectors derived from the change to the position of the 2D representation of the subject between two or more of the plurality of frames.

14. The motion capture system of claim 13, wherein each frame in the plurality of frames comprises a 2D image of the subject in a real 3D space.

15. The motion capture system of claim 13, wherein the geometry tracker is further configured to project the identified change onto the virtual 3D space as 3D constraints.

16. The motion capture system of claim 13, wherein identifying the change to the 2D representation of the subject comprises identifying subsections of textures and tracking 2D location changes of the subsections in a first frame relative to a second frame.

17. A non-transitory computer readable medium comprising instructions stored thereon which, when executed by one or more processing devices, cause the one or more processing devices to perform operations comprising:
  accessing a 3D model;
  associating the 3D model with a 2D representation of a subject in a plurality of frames, wherein the plurality of frames captures the subject in a real 3D space;
  identifying one or more motion vectors derived from a change to the position of the 2D representation of the subject between two or more of the plurality of frames; and
  deforming the 3D model in a virtual 3D space, wherein the deforming is based on:
    the identified change to the position of the 2D representation; and
    at least one constraint restricting how the 3D model can be deformed,
  wherein the at least one constraint comprises the one or more motion vectors.

18. The non-transitory computer readable medium of claim 17, wherein each frame in the plurality of frames comprises a 2D image of the subject in a real 3D space.

19. The non-transitory computer readable medium of claim 17, wherein the instructions cause the one or more processing devices to perform operations further comprising projecting the identified change onto the virtual 3D space as 3D constraints.

20. The non-transitory computer readable medium of claim 17, wherein identifying the change to the 2D representation of the subject comprises identifying subsections of textures and tracking 2D location changes of the subsections in a first frame relative to a second frame.

* * * * *